United States Patent [19]
Macri et al.

[11] Patent Number: 5,643,094
[45] Date of Patent: *Jul. 1, 1997

[54] INTERACTIVE ICE AND ROLLER HOCKEY TRAINING, COACHING, AND PLAYING RINKS

[76] Inventors: Vincent J. Macri, 5 Timber Brook La., Durham, N.H. 03824; Robert O. Magaw, Two Langdon Rd., Carle Place, N.Y. 11514; Paul Zilber, 38 Melony Ave., Plainview, N.Y. 11803

[*] Notice: The term of this patent shall not extend beyond the expiration date of Pat. No. 5,647,747.

[21] Appl. No.: 375,606

[22] Filed: Jan. 20, 1995

[51] Int. Cl.⁶ .................................................. A63C 19/10
[52] U.S. Cl. .................................................. 472/92; 434/256
[58] Field of Search .............................. 472/89, 90, 91, 472/92, 136, 70; 273/57.2, 411; 434/247, 256

[56] References Cited

U.S. PATENT DOCUMENTS

| | | | |
|---|---|---|---|
| 730,956 | 6/1903 | Needham | 472/90 X |
| 2,153,384 | 4/1939 | Mazza | 273/55 |
| 3,765,675 | 10/1973 | DiMarzio | 273/57.2 |
| 3,898,438 | 8/1975 | Nater et al. | 235/151 |
| 4,021,651 | 5/1977 | Mitsuhashi et al. | 235/151.11 |
| 4,085,540 | 4/1978 | Jernstrom et al. | 46/119 |
| 4,534,557 | 8/1985 | Bigelow et al. | 273/55 A |
| 4,688,792 | 8/1987 | Rivkin | 272/76 |
| 4,752,764 | 6/1988 | Peterson et al. | 340/323 |
| 4,805,631 | 2/1989 | Roi du Maroc, II | 128/710 |
| 4,941,660 | 7/1990 | Winn et al. | 272/76 |
| 5,048,822 | 9/1991 | Murphy | 272/78 |
| 5,100,138 | 3/1992 | Wilde | 273/85 R |
| 5,224,710 | 7/1993 | Feokhari | 273/247 |
| 5,249,968 | 10/1993 | O'Leary et al. | 434/247 |
| 5,280,905 | 1/1994 | Micco | 273/55 A |
| 5,312,109 | 5/1994 | Cagle | 273/411 |
| 5,344,323 | 9/1994 | Burns | 434/250 |
| 5,363,297 | 11/1994 | Larson et al. | 364/410 |
| 5,503,606 | 4/1996 | Stephens | 482/7 |

FOREIGN PATENT DOCUMENTS

| | | | |
|---|---|---|---|
| 1071225 | 2/1980 | Canada | 273/57.2 |
| 1200917 | 12/1985 | U.S.S.R. | 434/247 |
| 1405858 | 6/1988 | U.S.S.R. | 482/83 |

OTHER PUBLICATIONS

M. Okui, et al., "Locus Display of Moving Sports Players," *8012 SMPTE Journal* 96 (7):667–673 (Jul. 1987).

*Primary Examiner*—Kien T. Nguyen
*Attorney, Agent, or Firm*—Hamilton, Brook, Smith & Reynolds, P.C.

[57] ABSTRACT

The invention comprises a hockey rink used for instruction, training, coaching, practice and competitive play in ice and roller hockey. The structure of the invention comprises an ice or roller hockey rink, of standard or other size, consisting of a playing surface with markings, two goal nets, and surrounding boundary boards. The invention further comprises facilities for training hockey players consisting of one or more mechanized robots suspended from an overhead track, a training area containing computerized equipment for controlling the robots and receiving contact feedback from the robots, video equipment for recording practice, coaching and game playing activities, and digital computer equipment to be used by players for interactive instructional purposes in rooms adjacent to the rink.

15 Claims, 9 Drawing Sheets

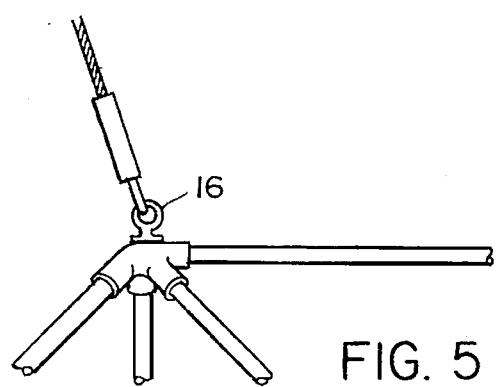
FIG. 5
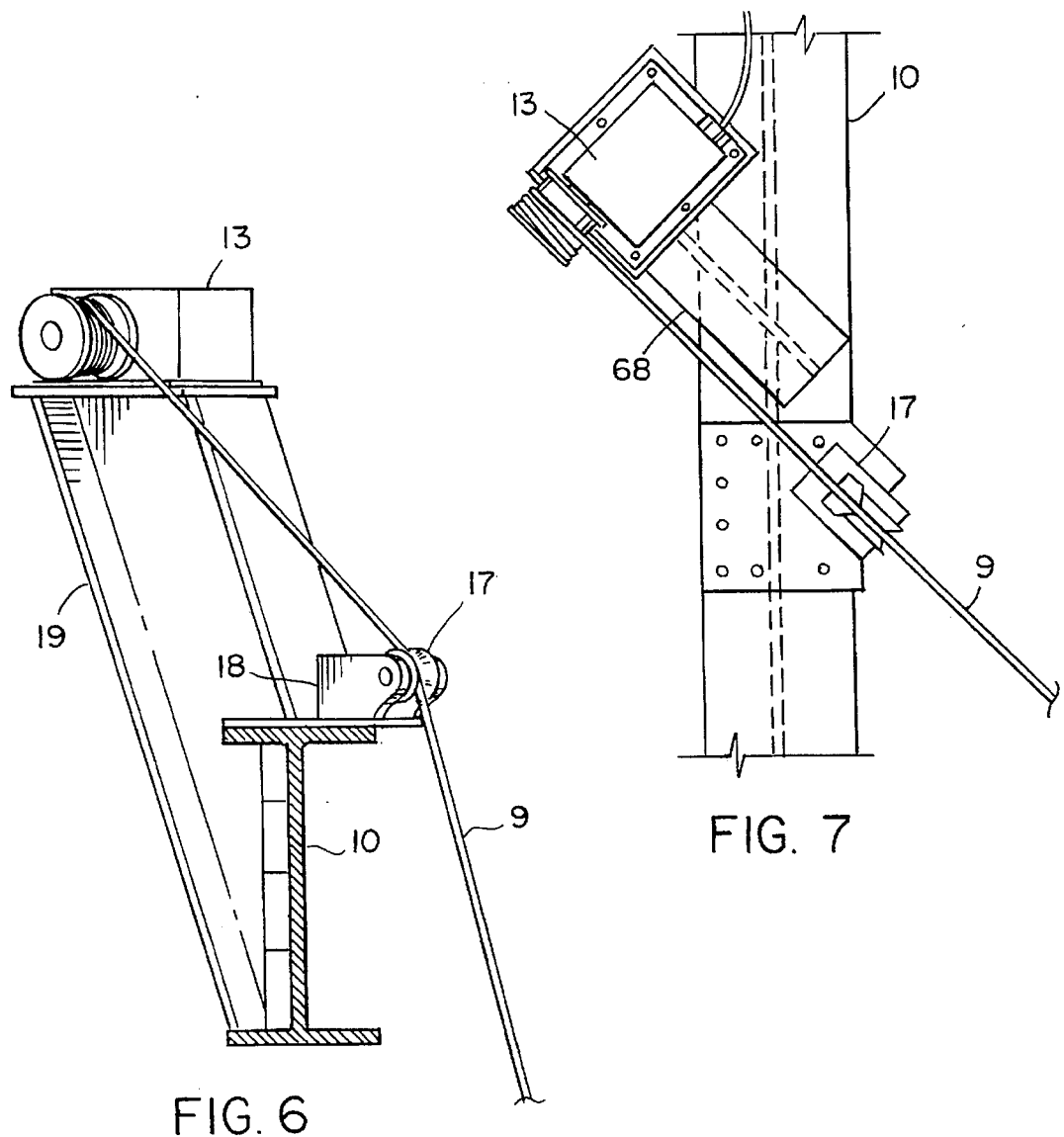
FIG. 6
FIG. 7

INTERACTIVE ICE AND ROLLER HOCKEY TRAINING, COACHING, AND PLAYING RINKS

BACKGROUND OF THE INVENTION

1. Field of the Invention

The present invention relates to the art of instruction, training, coaching, and competitive rink facilities, and particularly to a rink used in the sport of ice or roller hockey.

2. Description of the Prior Art

Ice (and roller) hockey is a fast and dynamic sport. Each player's "on-ice" position constantly changes. Team and individual play continually alternates from offense to defense and back again, usually in a matter of seconds (or fractions of second).

Among hockey instructors, trainers, coaches, and players there is great emphasis on "a good work ethic". That emphasis is a practical recognition of what is required of ice hockey players, namely that they be persistently attacking (on offense), aware of conditions leading to counter-attacks, defending against attacks (on defense), and at all times in motion.

Instruction, training, and practicing for ice hockey are relatively complex and demanding. Hockey is a "high skill" game with a long and steep learning curve. Players are required to skate, handle hockey sticks so as to control the puck (known as stickhandling), pass, shoot, understand positional and situational play, check (blocking the opponent) and execute many individual skills, in very close sequential order, while working in concert with teammates.

Ice hockey instruction usually begins with the demonstration (or explanation) of a skill, tactic, or maneuver by the instructor, followed by repetitious execution (practice) by players. Practice sessions typically include individual skill development and team preparation. Speed and power skating (explosive starts and stamina building) drills as well as stickhandling, passing, shooting, checking, and other individual aspects of the game are usually incorporated into practice sessions and selected team plays are practiced as well. For example, plays which require constant repetition include those that originate in the face-off circles, those that develop while in offensive command of the puck, and/or those that occur while executing defensive maneuvers. Ice hockey is a unique sport in terms of its requirements for speed, balance, strength, timing, panoramic vision, and agility as well as the team plays which are major components of the game.

Ice hockey players need to achieve a high level of fundamental physical/athletic skill in at least seven areas. They are: (1) agility, (2) balance, (3) form, (4) impact, (5) speed, (6) strength, and (7) timing.

Teams need to improve performance by practicing passing, playmaking on offense and defense, player advantage and disadvantage tactics used during: (1) power plays (advantage), i.e. when, due to penalties to the opposing team, the opposing team loses one or more of its players for a period of time giving the advantaged team a one or more player advantage or, (2) conversely, short handed (disadvantage) tactics, known as penalty-killing.

In order to make the most of each instructing, training or coaching session, players must attain and repeat a high level of control over each of the seven fundamental physical/athletic aspects of the game noted above. Team players must similarly attain a high degree of accomplishment in executing plays that require command of both physical/athletic and cognitive skills.

It is generally recognized that the amount of time spent practicing on the ice ("ice time" for both hockey players and teams) bears a strong relationship to the attainment of skills. However, it is also generally recognized that within most geographical areas there is a shortage of available ice time. There is on-going competition for ice time and therefore blocks of time for instructing, training and coaching is limited for many players and teams. In the struggle and scramble for quantitative "ice time", attention to the optimal qualitative use of that time has been subordinated.

Currently, the objectives of ice hockey instructors are reached with few or no technological aids. For example, electro-mechanical devices for controlling on-ice playing variables and repeating specific conditions, so that individual skills and team play can be enhanced, is virtually nonexistent. Similarly, electronic measuring devices and computer assisted (or interactive computer "games") technology for training and coaching are virtually non-existent. Devices currently used for instruction/practice in ice hockey include:

(1) nylon parachutes pulled by the skater(s) (used to increase drag, and therefore, the skater's leg strength by overcoming the drag), (2) surgical tubing attached to a harness on the skater's shoulders and, at the lowest point, to the skates causing the skater to bend at the knees and waist while skating (a preferred skating position for ice and roller hockey), (3) lengths of wooden boards (or hockey sticks) placed on the ice for practicing jumps and other skating maneuvers, and (4) orange plastic traffic cones, used as pathmarkers for skating drills.

Devices (1) and (2) mentioned above are designed to increase players' strength and form but do not provide instruction/practice in the skills, moves and maneuvers which are particular to ice and roller hockey.

Devices (3) and (4) described above (i.e. the use of wooden boards and orange plastic traffic cones) can be used to practice skating maneuvers in ice hockey but suffer from their placement (on the surface of the ice), which is to say that the skater is forced to pay undue attention to the surface of the ice. Looking at the ice surface is contrary to what must be done to play ice hockey. Playing ice hockey requires lines of sight to teammates and opponents and far less so to the puck (on the ice surface) itself. In effect, guiding, passing or shooting the puck must be mastered so that they are done by touch and timing, leaving the skater free to see his/her competitive opportunities. Realistic training devices would, therefore, provide above-ice lines of sight. Even with unlimited ice time, learning and teaching the skills of the sport suffer from the absence of conditions that simulate a realistic skating environment. As a consequence, learning is prolonged or poorly assimilated and practicing becomes arduous, less specific, and less effective than desired.

It is difficult to provide players with precise conditions that would allow them to emulate ideal maneuvers or to practice against an ideal opposing player (or team). The problem is controlling the variables. In existing practice sessions a player usually practices opposite the instructor or another player(s). Since every "opposing" player or instructor is prone to human error or simply fatigue, maneuvers and skills cannot be repeated in a desired optimal fashion. This process inhibits players from practicing a desired maneuver until it is perfected: it lengthens the learning process and "loses" many players except for the truly motivated. Players may learn "bad habits" while playing opposite a less than a carefully structured opponent or by emulating a less than proficient example. Instructors, trainers and coaches face a daunting challenge, to control, in a time-effective manner, the conditions (variables) on ice, so as to achieve enhanced individual skills and team play.

SUMMARY OF THE INVENTION

The need to use ice time qualitatively, and time-effectively on a technologically enhanced ice rink, is addressed by this application. The invention comprises an ice rink, of standard or other size, consisting of a playing surface with markings, two goal nets, two penalty boxes, three rooms (adjacent to the rink with a transparent, plexi-glass wall in each room facing the rink), and seating for spectators. The invention further comprises means for enhanced instruction in the sport of ice hockey consisting of one or more mechanized robots suspended from overhead tracks. The robots are designed to simulate hockey players and to move along the overhead tracks in a manner which will simulate actual plays and maneuvers used in the sport of ice hockey. The robots are equipped with electronic sensors that enable performance measurements to be obtained during training sessions with players and transmitted to computer terminals in a training area.

With regard to skills such as agility, balance, speed and power skating, the robots will be used to measure player "contacts", i.e. executing a drill in the least amount of time, with fewest contacts being optimal.

With regard to stick handling, passing, shooting and positional play, the robots will be used to measure accuracy by recording the number of times the robots are hit by pucks (or players themselves) during stickhandling, passing or shooting (i.e. how much of an obstruction the robots are to the player) and, using video tapes (or other means of recording action), how well the player(s) is positioned according to the location of the robot(s).

With regard to checking and contesting for control of the puck, the robots will measure impact, i.e. the force of contact.

In addition to the foregoing devices, a network of video cameras and magic eye recorders will be used to measure speed and accuracy and to obtain visual records of training sessions. These records may be used for performance feedback before, during, and after instructive training or coaching sessions.

BRIEF DESCRIPTION OF THE DRAWINGS

FIG. 5 is a side view of a suspension cable connection to a track assembly.

FIG. 6 is an elevation view of a suspension cable as it is fed through the guide pulley and hoist motor.

FIG. 7 is a plan view of the suspension cable as it is fed through the guide pulley and hoist motor.

DETAILED DESCRIPTION OF THE INVENTION

Figure 1:
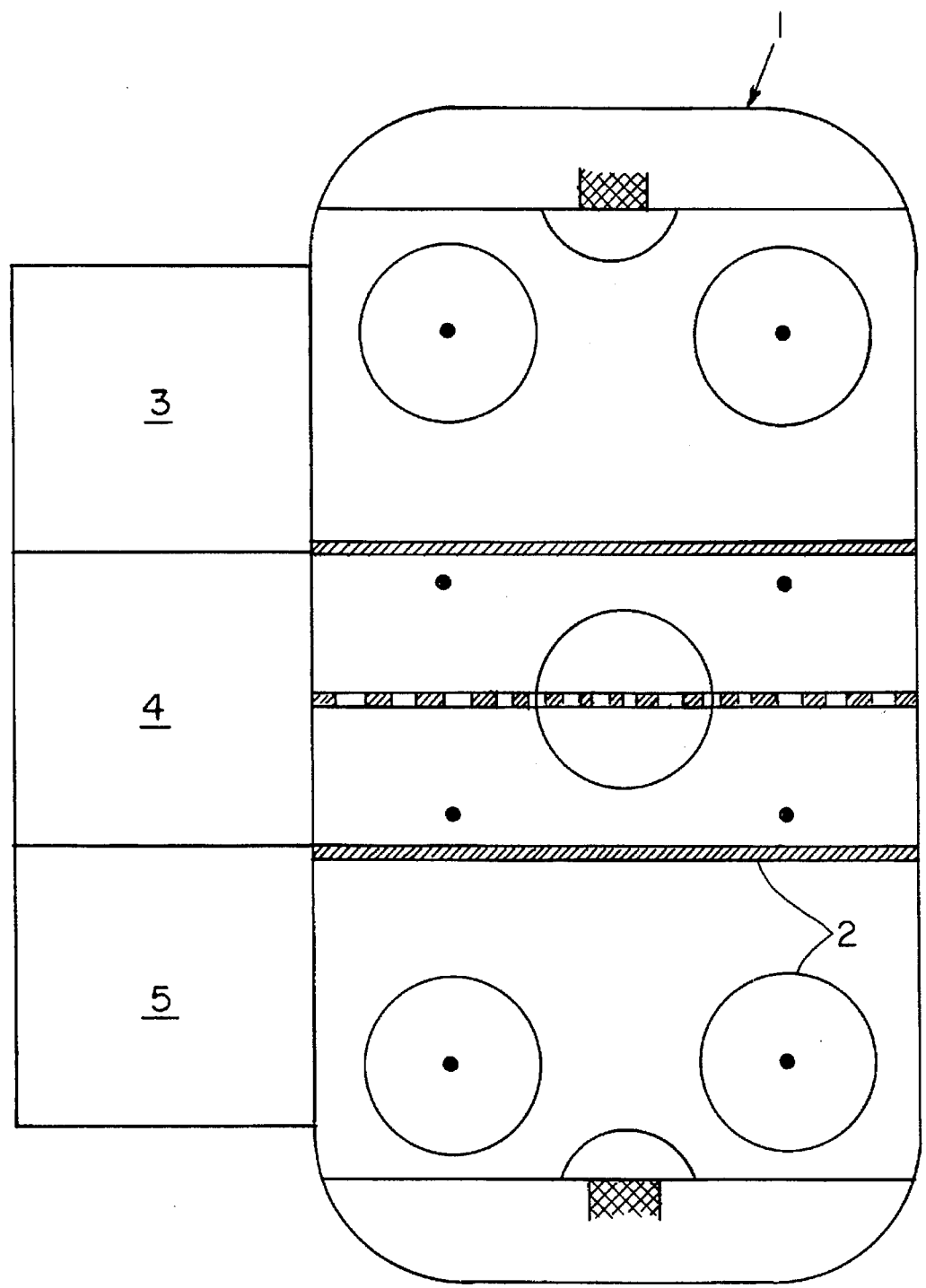
FIG. 1 is a plan schematic of the rink and the adjoining training rooms.

Referring to FIG. 1, the present invention comprises a hockey rink 1 used for instruction, practice and play in the sport of ice hockey. The rink may contain markings 2 similar to those in a standard hockey rink. Three rooms (approximately 45 feet by 45 feet in size) adjacent to the hockey rink may be used for control computers 3, video replay 4, and game planning 5.

Figure 2A:
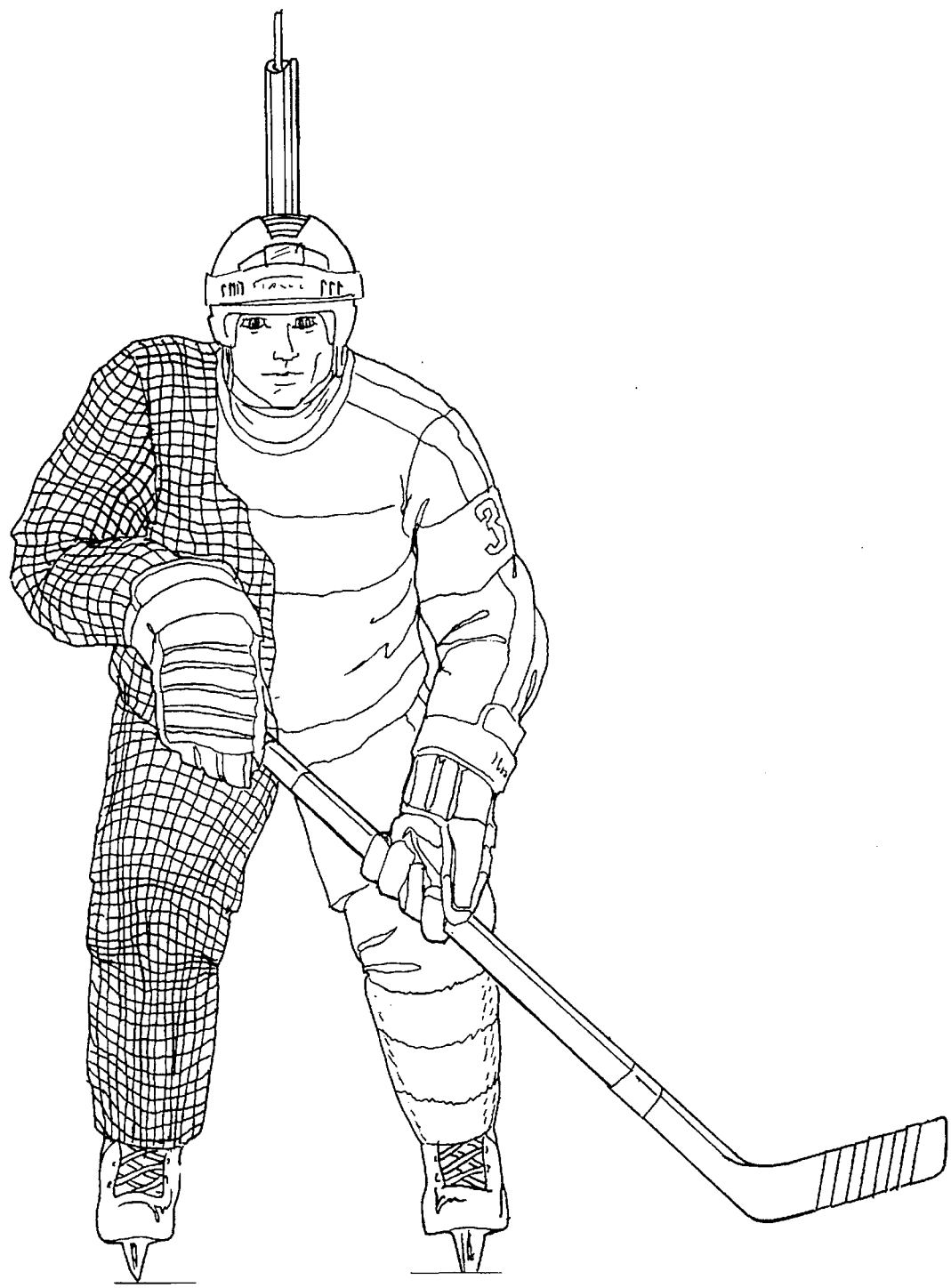
FIG. 2a is a front view of a mechanized robot designed according to the present invention to resemble a hockey player.
Figure 2B:
FIG. 2b is a side view of a mechanized robot.

The invention further comprises facilities for instruction in the sport of ice hockey consisting of one or more mechanized robots (FIG. 2a), in human form, outfitted to resemble hockey players, such as the mechanized robots described in pending U.S. patent application Ser. No. 08/375,617, filed Jan. 20, 1995 by Vincent J. Macri, and, entitled "Mechanized Robots for Use in Instruction, Training, and Practice in the Sport of Ice and Roller Hockey". That pending patent application is incorporated herein by this reference. FIG. 2b shows a side view of one of the mechanized robots. The robots are suspended from overhead track assemblies which enable movement along a course that is designed to simulate typical skating patterns followed during hockey games. The design of the invention will enable players to learn and to practice in realistic conditions and to repeat drills needed to master the fundamental maneuvers and tactics essential to ice hockey. Each robot can also contain a substance to provide variable weight to the robot, such as sand or water.

Figure 3:
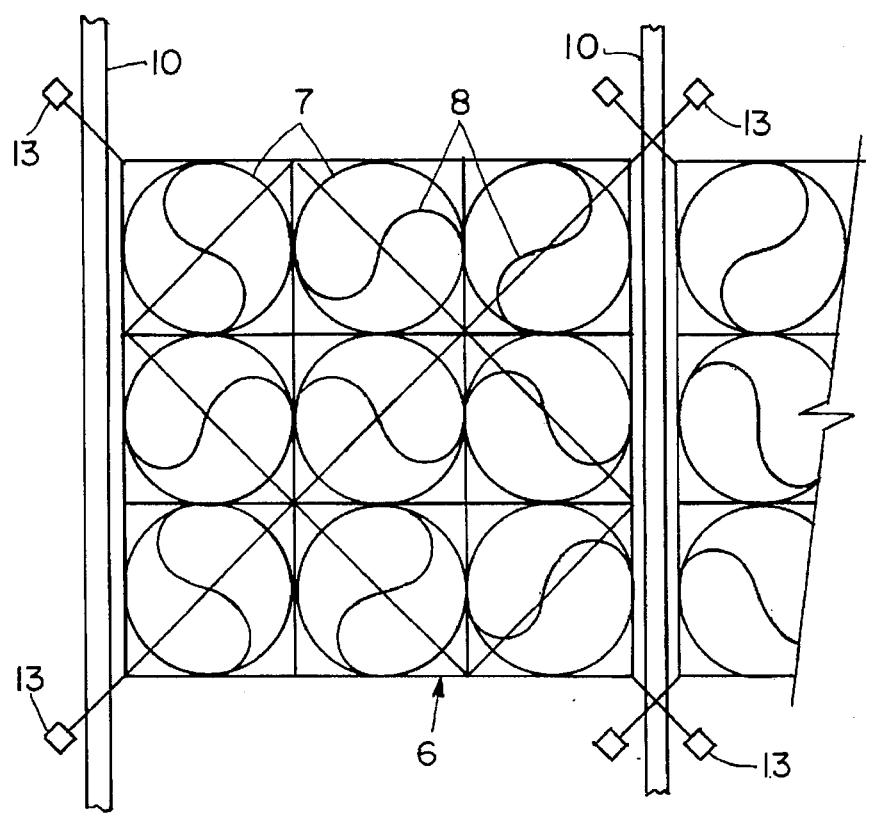
FIG. 3 is a plan schematic of the track assembly from which the robots are suspended including the hoist point locations.

The size of the ice rink will determine the number of track assemblies which can be built into the facility. Each track assembly is approximately 24 square feet and may contain from one to nine mechanized robots. FIG. 3, illustrates a plan schematic of the track assembly 6 which contains a block of nine circles 7, each crossed by a figure "S" 8. Larger rink facilities may contain more than one track assembly, each containing from one to nine robot players. This design will enable rink facilities to be used by more than one team at a time, and thus, increase "ice time" for ice hockey players. In addition, smaller facilities with fewer track assemblies may be built where resources are limited or when it is advantageous to have fewer players on the ice.

Figure 4A:
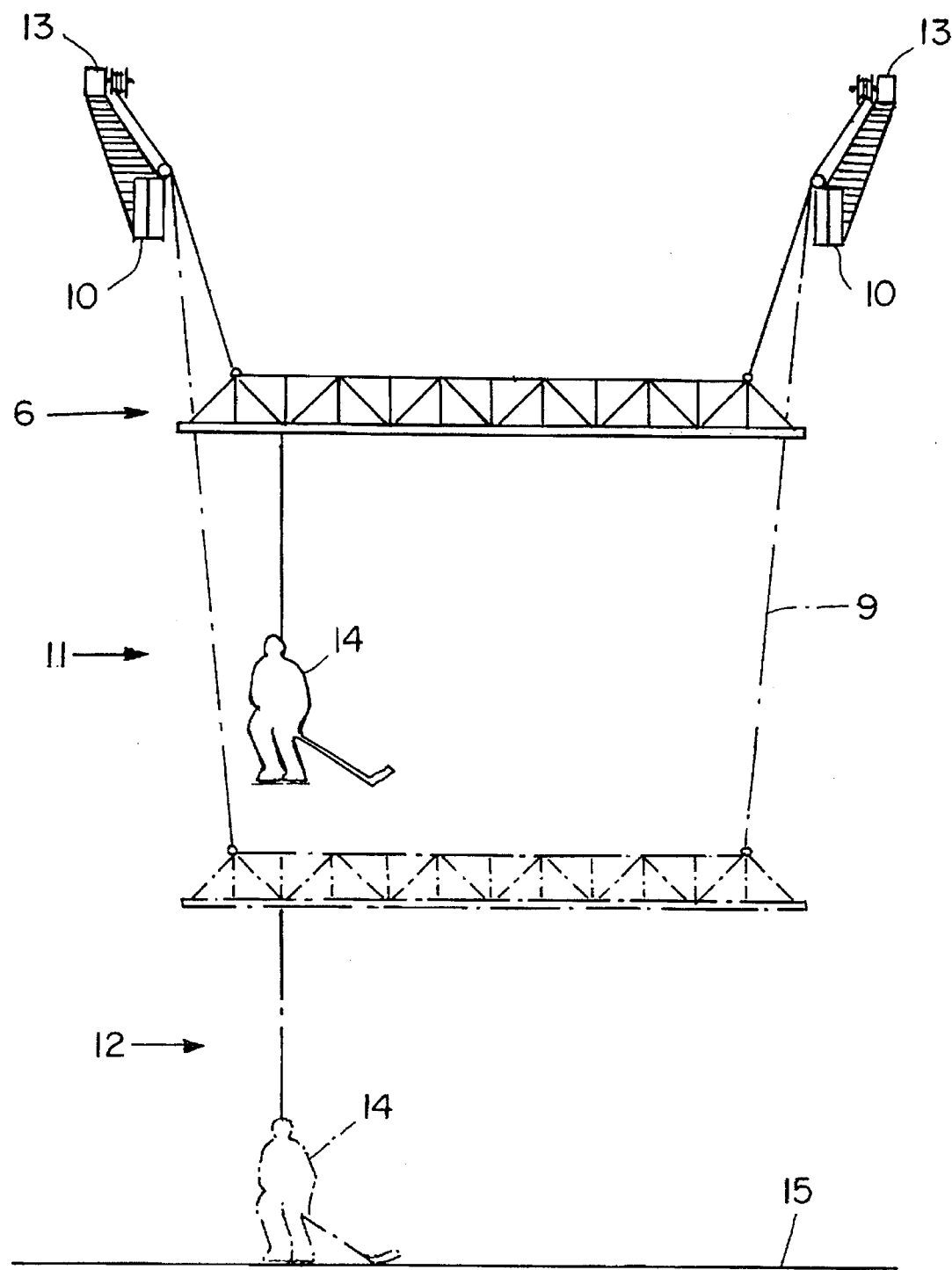
FIG. 4a is an elevation schematic of a track assembly in the raised and lowered positions.

When not in use, the track assemblies and robots can be raised to a position above the surface of the ice rink (FIG. 4a). Each track assembly is suspended by four steel cables 9, each cable approximately one inch thick. The cables are suspended from the steel superstructure of the building frame 10 itself. Each track assembly 6 moves between a raised position 11 (approximately 32 feet above the surface of the ice) and a lowered position 12 via four hoist motors 13 located above the building frame. In the lowered position the robots 14 are approximately ¼ inch above the surface of the ice 15.

Figure 4B:
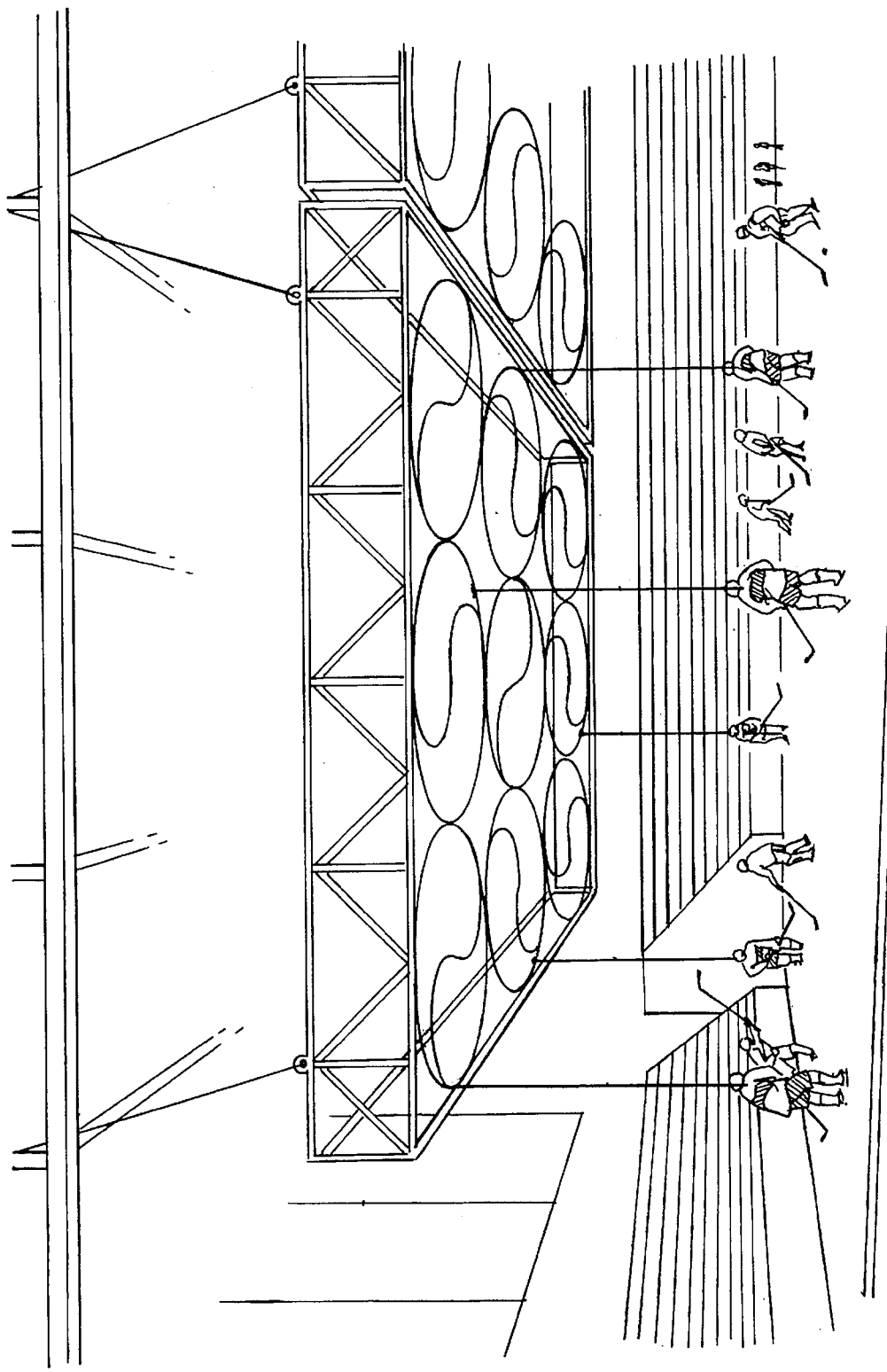
FIG. 4b is a perspective view of the robots and track assembly in the lowered position.
Figure 4C:
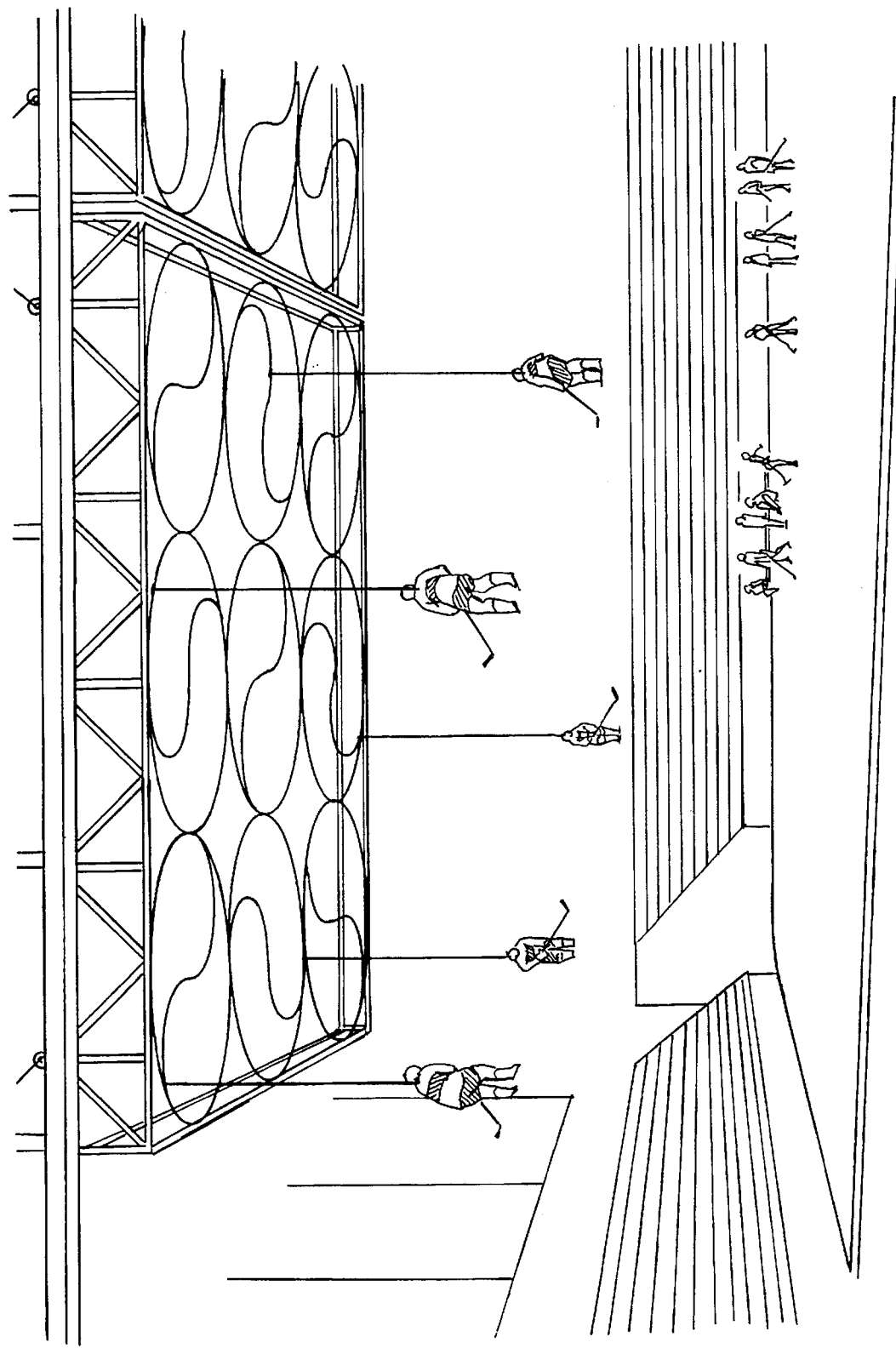
FIG. 4c is a perspective view of the robots and track assembly in the raised position.

FIG. 4b shows a perspective view of the robots in the lowered position as they are used during a training session. FIG. 4c shows the robots raised above the surface of the ice. When the robots are in the raised position, the ice rink may be used for hockey games, practice sessions, or other skating functions.

Referring to FIG. 5, each cable is attached to the track assembly by a steel eyebolt 16. FIG. 6 contains an elevation view indicating how a suspension cable 9 is fed to a hoist motor 13. Each of the four suspension cables is controlled by its own motor. The four motors simultaneously raise and lower the track assembly.

Each suspension cable is guided by a pulley 17 which is connected to the building frame by a structural steel pulley mount 18. The hoist motor 13 is positioned above the building frame 10 by a structural steel standoff bracket hoist motor mount 19.

FIG. 7 contains a plan view of a hoist assembly. This diagram illustrates that each hoist assembly, containing a hoist motor 13, steel cable 9, and guide pulley 17, is connected at an angle to the building frame 10. The positions of the four hoist motors and suspension cables are also illustrated by FIG. 3.

Figure 8:
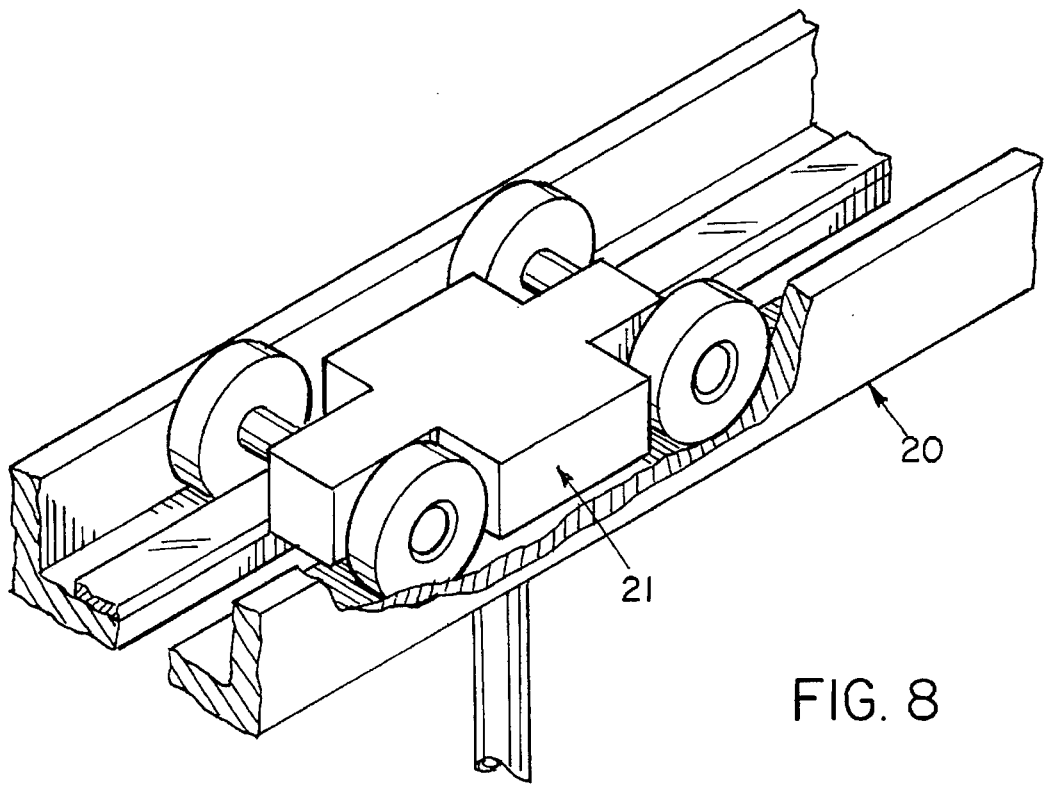
FIG. 8 is an illustration of the motorized car which runs inside the track assembly.

Referring to FIG. 8, the tracks 20 are made of steel and a conductive material made of copper or copper alloy. Each robot will be moved by a motorized car 21 running inside the track, the direction of which will be controlled by a computer program.

A simple potentiometer controls the speed at which the robots move along the track and across the ice. Increases and decreases in the voltage fed to the potentiometer will allow the robots to increase or decrease speed during maneuvers.

The formations and drills executed by the robots will be selected by the instructor from a computerized menu. The instructor may choose to repeat specific maneuvers or vary the drills executed in the practice session. In addition, since the robots perform according to preprogrammed patterns, they will be able to precisely repeat plays and individual maneuvers (straightforward or difficult) each time they are activated. This will assist players to improve skills and to avoid "bad habits" as they progress in the sport.

Figure 9B:
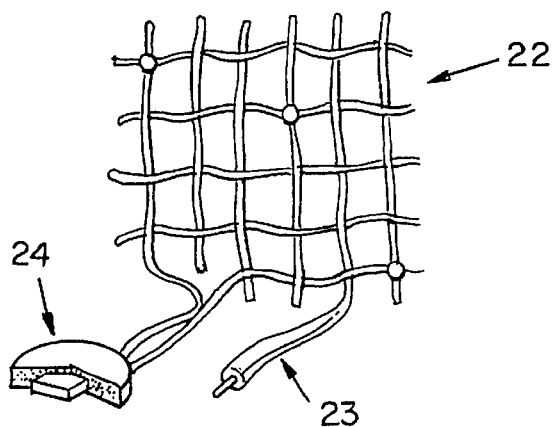
FIG. 9A is a front view of a mechanized robot with a detailed illustration of a section of the sensor mesh in FIG. 9B.
Figure 9A:
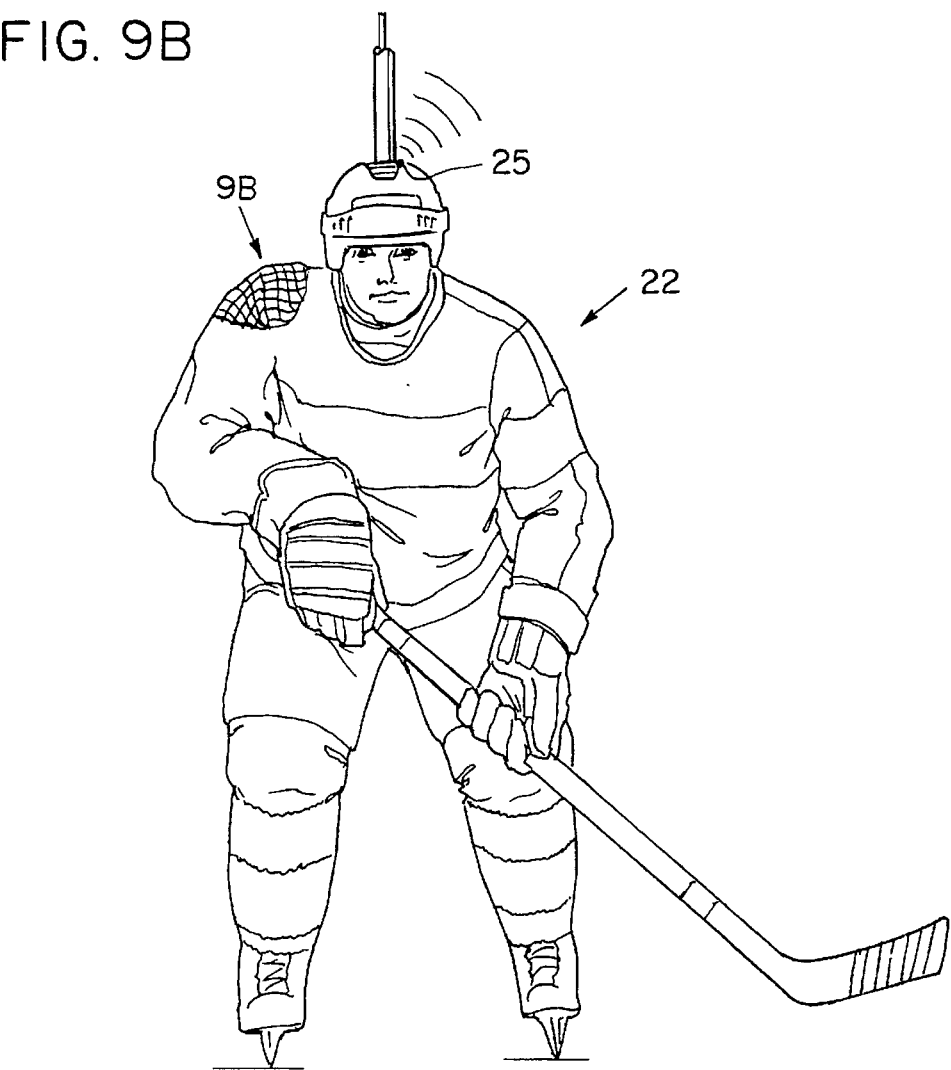

Performance measures describing each player's training session will be communicated by sensors located inside the robots (FIG. 9A). Beneath the uniform, as shown in FIG. 9B, the robots are covered with a flexible fabric containing a grid-like mesh 22 comprised of micro volt wiring 23 connecting a series of silicon sensor chips 24. The sensor chips count the number of times and measure force of impact with which a skater (hockey player) contacts the mechanized robot.

Each robot is equipped with a transmitter 25 which communicates information obtained from the sensors to the instructor's computer. Information from each player's performance in the drill will be used to measure speed, agility, force of impact, timing, positioning, reaction time, and other important factors.

Training sessions may adopt the following or similar format:
(1) coach, instructor or trainer selects on ice program from computer menu,
(2) players are informed of on-ice program and shown a computer print-out diagram of the on-ice activity, alternatively a VCR film or interactive computer game serves as the pre-practice, on-ice, information vehicle,
(3) robots are positioned according to the program,
(4) robots are activated to execute the selected program,
(5) on-ice session begins and continues,
(6) player/robot interactive on-ice program ends,
(7) information is transmitted to training area,
(8) feed-back session is conducted with players.

Video cameras placed above the rink will enable the instructor to obtain a visual record of the player's performance. This record combined with the data obtained from the robots can be used to evaluate the player's total performance and serve as the basis of guidance and instruction to the player. The video recording of each maneuver or check can be overlaid with data transmitted from the robots indicating the speed, force of impact, or timing of each play. Feedback sessions will provide visual and numerically measurable information concerning the player's performance during the training session. This will facilitate discussion between the instructors and players regarding the player's level of achievement. The feedback session should also suggest which program should be activated for the robots during the next training session.

The foregoing details specific embodiments of the present invention. However, those skilled in the art will realize that further modifications may be made to the technologies or structures mentioned without departing from the scope of the invention. It is intended by this patent and the appended claims to encompass all such changes and modifications which fall within the spirit of this invention.

We claim:

1. A skating rink comprising:
    a skating surface;
    a plurality of mechanized robots in human form comprising an armature covered by impact padding, and a substance to provide weight to the robot;
    a support assembly over the skating surface;
    a suspension member for each robot connecting each robot to the support assembly such that each robot is suspended over the skating surface by a corresponding suspension member;
    movement means coupled to each suspension member for moving each suspension member and corresponding robot; and
    a processor for providing command signals to command the movement means to move the plurality of mechanized robots in individual patterns over the skating surface.

2. The skating rink of claim 1 wherein at least one of the mechanized robots includes a sensor for measuring impact when contacted and generating sensor data related to measured impact.

3. The skating rink of claim 2 wherein at least one of the mechanized robots further comprises means for transmitting the sensor data from the sensor to the processor.

4. The skating rink of claim 2 further comprising:
    means for storing the sensor data; and
    means for displaying the sensor data.

5. The skating rink of claim 4 further comprising:
    recording means for recording visual images of a user interacting with at least one of the robots; and wherein the recorded visual images are displayed with the sensor data.

6. The skating rink of claim 5 wherein the sensor data comprises numerically measurable information concerning the player's performance during the training session.

7. The skating rink of claim 1 wherein the processor comprises a computer.

8. The skating rink of claim 1 wherein each of the mechanized robots comprises:
    a uniform consistent with the sport of ice hockey; and
    a hockey stick movable along a vertical plane.

9. The skating rink of claim 1 wherein the support assembly comprises one or more track assemblies along which one or more mechanized robots are movable, movement of a robot within a track assembly being controlled by the processor.

10. The skating rink of claim 9 wherein each track assembly is comprised of a block of circles each crossed by a figure "S".

11. The skating rink of claim 1 further comprising a hoist mechanism for raising the support assembly and mechanized robots when not in use to a height above the skating surface to allow normal use of the skating surface.

12. The skating rink of claim 11 wherein the hoist mechanism comprises a hoist motor located above a frame of a building enclosing the skating surface.

13. The skating rink of claim 1 further comprising one or more sensing devices adjacent to the skating surface for sensing activity on the skating surface.

14. The skating rink of claim 13 wherein the sensing devices comprise a video camera.

15. The skating rink of claim 13 wherein the sensing devices comprise an impact sensor on at least one of the mechanized robots.

* * * * *